United States Patent [19]
Reckner, Jr.

[11] Patent Number: 6,135,526
[45] Date of Patent: Oct. 24, 2000

[54] FOLDING STEP WITH INTEGRATED STORAGE COMPARTMENT FOR FOLDING CAMPING TRAILER

[75] Inventor: Charles R. Reckner, Jr., Boswell, Pa.

[73] Assignee: Fleetwood Folding Trailers, Inc., Somerset, Pa.

[21] Appl. No.: 09/314,250

[22] Filed: May 18, 1999

Related U.S. Application Data

[60] Provisional application No. 60/086,537, May 22, 1998.

[51] Int. Cl.[7] ................................................ B60N 3/12
[52] U.S. Cl. ........................ 296/37.13; 296/156; 52/64; 52/186; 182/127; 182/91
[58] Field of Search .............................. 296/37.13, 156, 296/168; 280/163, 164.1; 52/64, 186; 182/127, 91, 88

[56] References Cited

U.S. PATENT DOCUMENTS

| | | | |
|---|---|---|---|
| D. 211,167 | 5/1968 | Smith et al. ........................... | D14/3 |
| 2,197,266 | 4/1940 | Fredell . | |
| 2,453,937 | 11/1948 | Ray . | |
| 3,288,521 | 11/1966 | Patnode .................................. | 296/23 |
| 3,347,591 | 10/1967 | Soroos et al. .......................... | 296/23 |
| 3,392,990 | 7/1968 | Wolf . | |
| 3,488,082 | 1/1970 | Wallace ................................. | 296/23 |
| 3,488,085 | 1/1970 | Wallace ................................. | 296/27 |
| 3,507,535 | 4/1970 | Wallace ................................. | 296/23 |
| 3,514,150 | 5/1970 | Wallace ................................. | 296/23 |
| 4,534,601 | 8/1985 | Zwick ................................... | 312/266 |
| 4,842,325 | 6/1989 | Irelan ................................... | 296/146 |
| 5,131,492 | 7/1992 | Caminiti et al. ....................... | 182/77 |
| 5,458,353 | 10/1995 | Hanemaayer ......................... | 280/164.1 |
| 5,695,207 | 12/1997 | Mouterde et al. ...................... | 280/163 |

*Primary Examiner*—D. Glenn Dayoan
*Assistant Examiner*—Mickki D. Murray
*Attorney, Agent, or Firm*—Webb Ziesenheim Logsdon Orkin & Hanson, P.C.

[57] ABSTRACT

A folding camping trailer having a folding step with an integrated storage compartment generally includes a trailer body defining a doorway opening, a platform having a first side and a second side and a storage compartment connected to the platform. At least one of the platform and storage compartment is pivotally secured to the trailer body such that when the platform is in a first position, the platform is received in the doorway opening, and when the platform is rotated to a second position, the second side of the platform defines a step positioned adjacent the trailer body. In the first position of the platform, the first side of the platform preferably lies substantially in a plane defined by an external surface of the trailer body and the storage compartment is accessible to users of the folding trailer. In the second position of the folding trailer the storage compartment is substantially inaccessible to users of the folding trailer.

20 Claims, 7 Drawing Sheets

FOLDING STEP WITH INTEGRATED STORAGE COMPARTMENT FOR FOLDING CAMPING TRAILER

CROSS REFERENCE TO RELATED APPLICATION

This application claims the benefit of U.S. Provisional Application Ser. No. 60/086,537 filed May 22, 1998, entitled "Folding Step With Integrated Storage Compartment For Folding Camping Trailer".

BACKGROUND OF THE INVENTION

1. Field of the Invention

The present invention relates to folding camping trailers and, more particularly, to folding camping trailers having a combined door and step assembly.

2. Description of the Prior Art

The use of camping trailers and recreational vehicles for comfortable travel is well known. Recreational vehicles include those that can be driven down the road as a self-contained unit and others that are towed such as folding camping trailers (hereinafter referred to as "folding trailers"). Besides providing shelter and creature comforts away from home, recreational vehicles must enable the owner to transport all manner of supplies, tools and lifestyle accessories such as camping equipment and hunting gear. This gear is commonly referred to as cargo. The ability to accommodate such cargo in storage areas integrally formed with the recreational vehicle is a major design goal of designers and manufacturers of recreational vehicles and, in particular, folding trailers.

When the user of a folding trailer arrives at a camping site, one of the user's first tasks is to setup the folding trailer and clear the camping site. This typically can involve unhooking the folding trailer from the towing vehicle, supporting the folding trailer with wood leveling blocks, raising the roof of the folding trailer and clearing the camping site with hand tools. The items necessary to complete these tasks generally include a crank handle for raising the folding trailer roof, wood blocks for leveling the folding trailer and hand tools, such as shovels, for clearing the camping site of debris. Each of these items is "bulky" and often tend to be single use items. There is a need in folding trailers for conveniently located and, preferably, integrally formed storage compartments in the folding trailers for storing articles such as these setup items.

A combined door and step assembly for use with folding trailers is known in the art and, in particular, from U.S. Pat. No. 3,488,082 to Wallace. The Wallace patent discloses a step and door support assembly for a folding trailer which includes a removable door. The door support is pivotally mounted on the folding trailer frame within a doorway opening of the frame. A folding step is also pivotally mounted on the folding trailer frame and is movable from a generally horizontal position to a position closing the doorway opening in the folding trailer side. The Wallace patent has no storage compartment located exterior of the folding trailer. The teachings of the Wallace patent are incorporated herein by reference.

An object of the present invention is to provide a folding trailer having conveniently located storage spaces for storing cargo items. It is a further object of the present invention to provide a folding trailer having storage spaces that are easily accessible by users of the folding trailer, yet utilize a combined door and step assembly.

SUMMARY OF THE INVENTION

Accordingly, I have invented a folding camping trailer having a trailer body defining a doorway opening, a platform having a first side and a second side and a storage compartment connected to the platform. At least one of the platform and the storage compartment is pivotally secured to the trailer body such that when the platform is in a first position, the platform is received in the doorway opening, and when the platform is rotated to a second position, the second side of the platform defines a step positioned adjacent the trailer body. In the first position of the platform, the first side of the platform preferably lies substantially in a plane defined by an external surface of the trailer body. The first side of the platform preferably conforms to the external surface of the trailer body.

The storage compartment may further include a storage compartment door pivotally secured to the storage compartment. The storage compartment door may include a locking mechanism adapted to releasably secure the storage compartment door to the storage compartment. The storage compartment may further include an internally positioned lip member providing a stop for the storage compartment door.

The platform may further include a pair of pivot arms pivotally connecting the platform to the trailer body and a pair of pivot pins pivotally connecting the storage compartment to the trailer body. The pivot arms may be adapted to maintain the platform in the first and second positions and in intermediate positions between the first and second positions. The pivot arms may each further include a first member formed with a pin and pivotally connected to the trailer body in the doorway opening and a second member defining a slot receiving the pin with the second member pivotally connected to the platform. The second member preferably rotates about the pin when the platform is rotated between the first and second positions. The pin may be received in the slot such that friction between the pin and a wall of the slot maintains the platform in the first and second position and in the intermediate positions therebetween.

The platform may also include a locking mechanism for securing the platform in the first position in the doorway opening. Furthermore, in the first position of the platform the storage compartment may be accessible, and in the second position of the platform the storage compartment may be substantially inaccessible.

Further details and advantages of the present invention will be clarified with reference to the following detailed description in conjunction with the drawings.

DETAILED DESCRIPTION OF THE PREFERRED EMBODIMENTS

Figure 1:
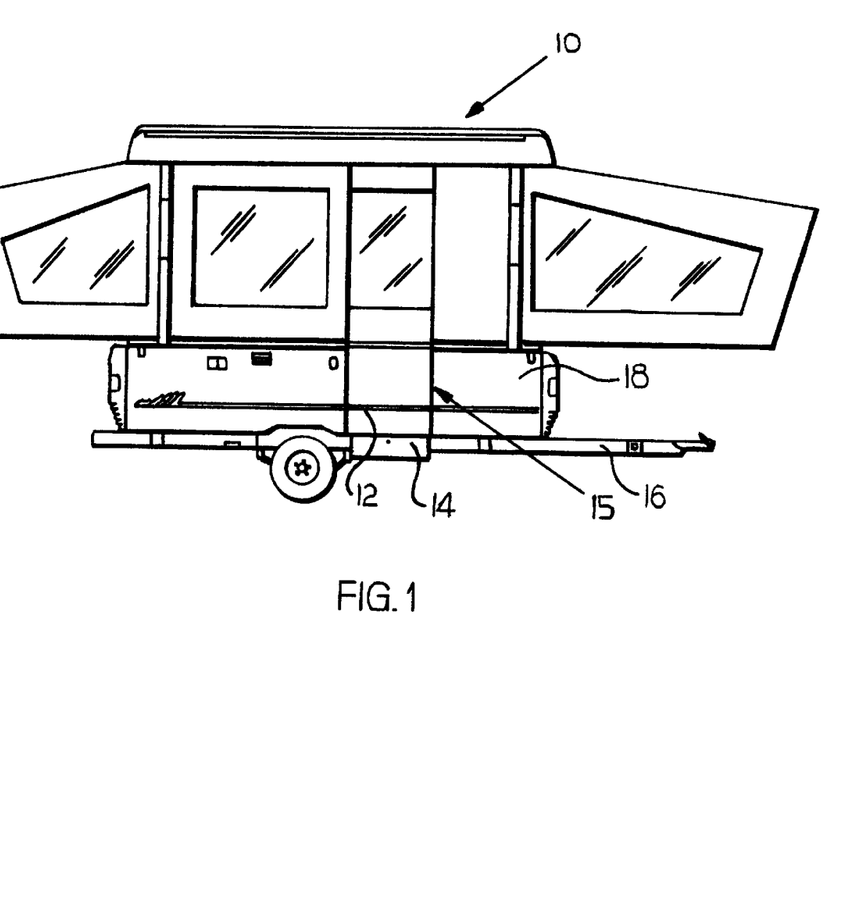
FIG. 1 is a side elevational view of a folding trailer having a pivoting platform in accordance with the present invention, with the folding trailer shown in an open position.
Figure 2:
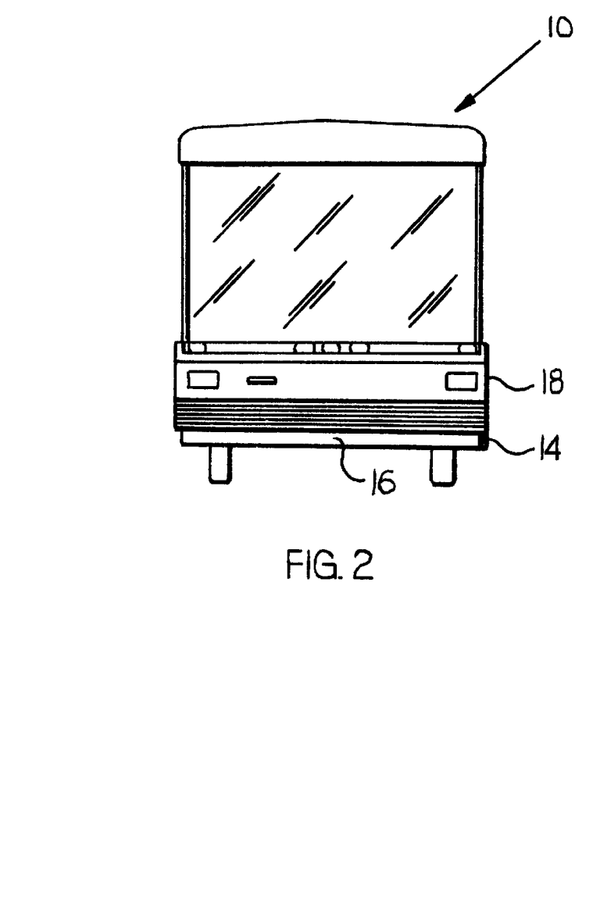
FIG. 2 is a rear elevational view of the folding trailer shown in FIG. 1.

FIGS. 1 and 2 show a folding camping trailer 10 (hereinafter "the folding trailer 10") having a folding step or platform 12 and a storage compartment 14 made in accordance with the present invention. The platform 12 and the storage compartment 14 are generally positioned in an entry door area 15 of the folding trailer 10. The folding trailer 10 generally further includes a trailer chassis 16 and a trailer body 18 attached to the trailer chassis 16.

The entry door area 15 of the folding trailer 10 is a practical location to provide the storage compartment 14 for several reasons. First, the entry door area 15 is usually one of the focal points of setting up the folding trailer 10. Consequently, the storage compartment 14 located in the entry door area 15 will expedite the retrieval of the setup items necessary to erect the folding trailer 10 and establish a cleared camping site. In addition, because storage space is at a premium in the folding trailer 10, it would beneficial to locate the storage compartment 14 in the entry door area 15 so that it does not detract from other established storage spaces in the folding trailer 10.

Figure 3:
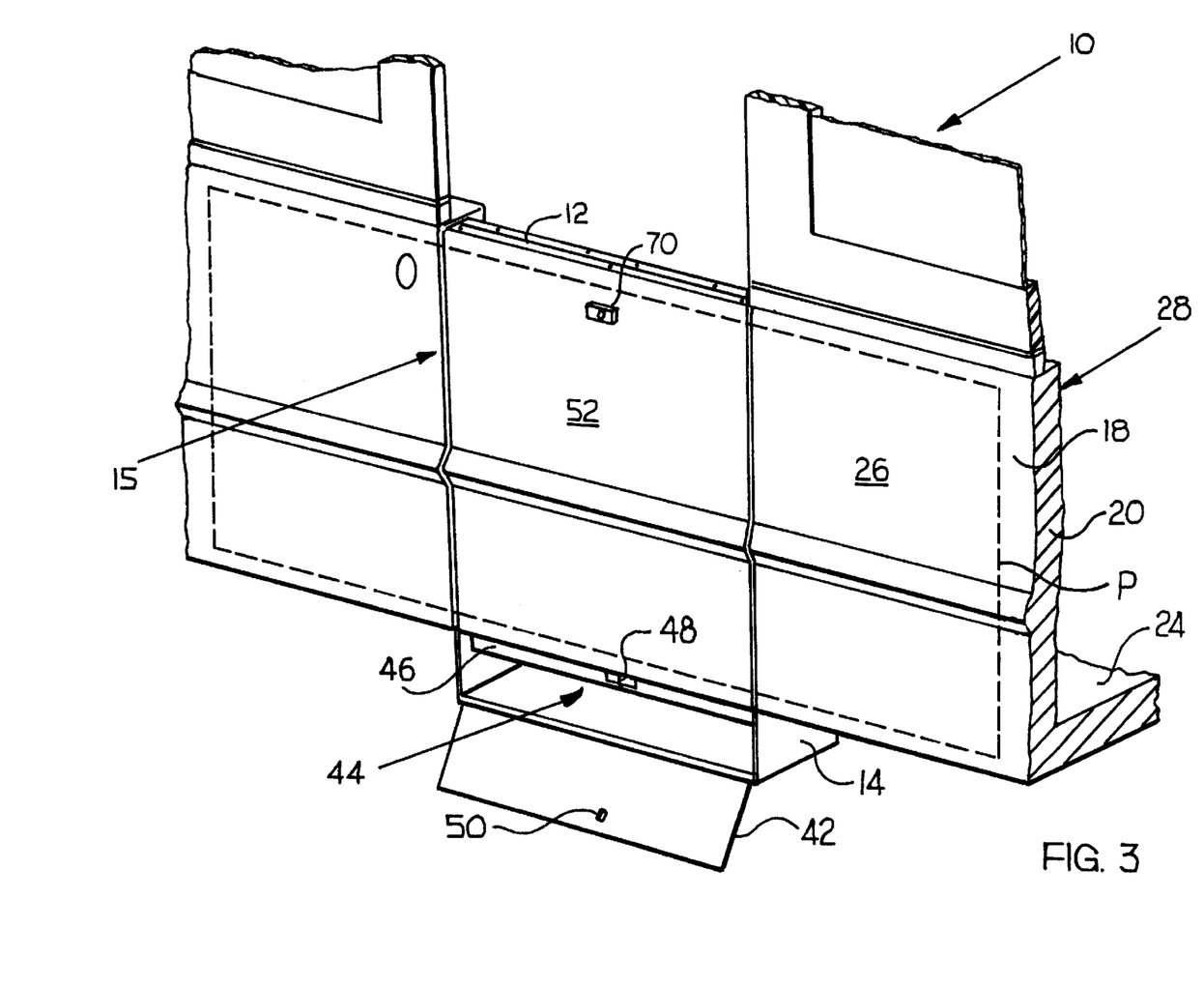
FIG. 3 is a perspective view of a portion of a side wall of the folding trailer shown in FIG. 1 and showing the platform of the folding trailer in a first position.
Figure 4:
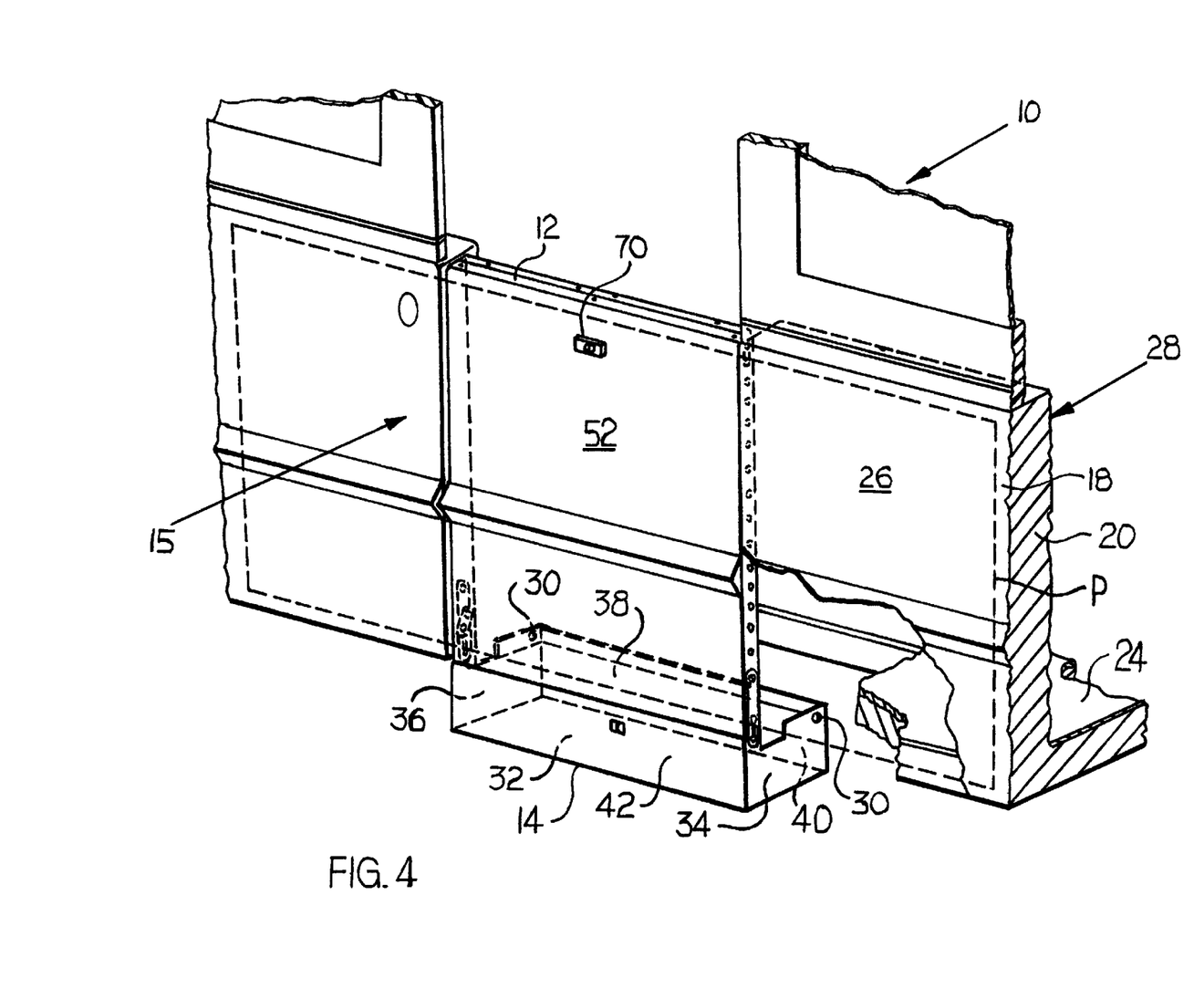
FIG. 4 is a perspective view of the folding trailer shown in FIG. 3 with the folding trailer body and floor partially cut away.
Figure 5:
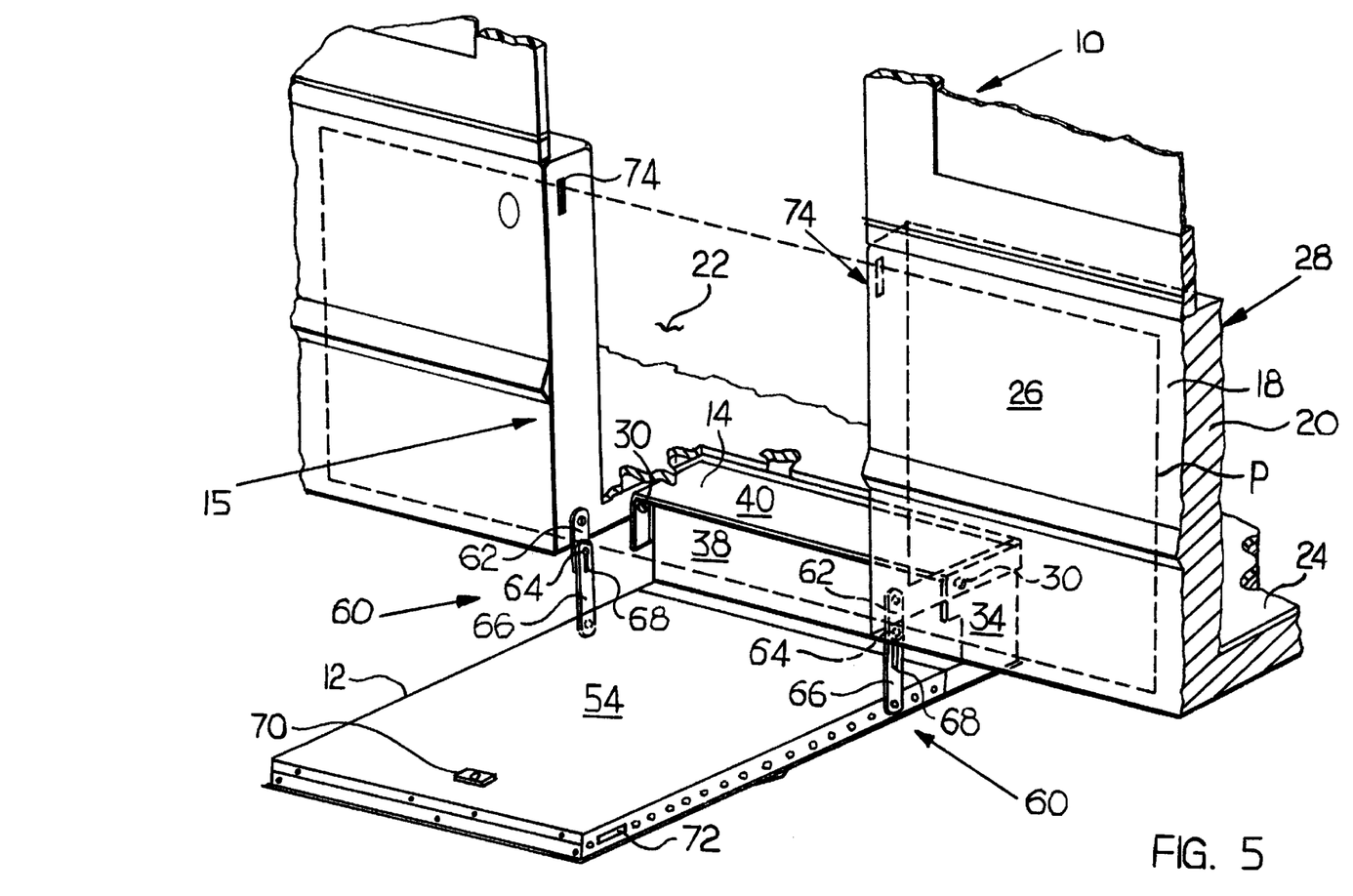
FIG. 5 is a perspective view of the folding trailer shown in FIG. 3 with the folding trailer floor partially cut away and showing the platform in a second position.

Referring to FIGS. 3–5, the trailer body 18 includes a side wall 20 that defines a doorway opening 22. The trailer body 18 further includes a floor 24. The side wall 20 includes an externally facing surface 26 and an internally facing surface 28. The platform 12 and the storage compartment 14 are pivotally secured to the trailer body 18 in the doorway opening 22 so that in a first or raised position of the platform 12, as shown in FIG. 3, the platform 12 closes the doorway opening 22 in the trailer body 18, and when the platform 12 is rotated to a second or lowered position, as shown in FIG. 5, the platform 12 defines a horizontal step positioned beneath the doorway opening 22 of the trailer body 18. In the preferred embodiment of the folding trailer 10 discussed above, the platform 12 is pivotally secured in the doorway opening 22 and the storage compartment 14 is pivotally secured to the trailer body 18 below the floor 24 of the trailer body 18. However, it will be apparent to those skilled in the art that only one of the platform 12 and the storage compartment 14 need be pivotally secured to the trailer body 18.

The platform 12 preferably includes the storage compartment 14 integrally formed with the platform 12 at one end of the platform 12. However, the storage compartment 14 may also be formed as a separate unit from the platform 12 and connected to one end of the platform 12 with, for example, mechanical fasteners or by welding. The storage compartment 14 is pivotally connected to the trailer body 18 by pivot pins 30. The storage compartment 14 preferably is rectangular-shaped and bounded by four side walls 32, 34, 36, 38 and one end wall 40. The other end of the storage compartment 14 is provided with a hinged storage compartment door 42. As shown in FIG. 3, the storage compartment door 42 in a first or opened position exposes the internal area bounded by the side walls 32, 34, 36, 38 and the end wall 40. In a second or closed position of the storage compartment door 42, as shown in FIG. 4, the storage compartment door 42 defines an enclosed space bounded by the side walls 32, 34, 36, 38, the end wall 40 and the storage compartment door 42 itself. The storage compartment door 42 may further include a locking mechanism 44 adapted to secure the storage compartment door 42 to the storage compartment 14. In the first or raised position of the platform 12, the storage compartment 14 is readily accessible by users of the folding trailer 10, as shown in FIG. 3. In the second or lowered position of the platform 12, the storage compartment 14 is substantially inaccessible by users of the folding trailer 10, as will be discussed further hereinafter.

The storage compartment 14 further includes a depending lip 46 located within the storage compartment 14 and provides a stop for the storage compartment door 42 in the closed position of the storage compartment door 42. The locking mechanism 44 may, for example, include a metal ring 48 and a cooperating opening 50 defined in the storage compartment door 42. As shown in FIG. 3, the metal ring 48 is attached to the lip 46. The metal ring 48 and the opening 50 cooperate so that when the storage compartment door 42 is in the closed position, the metal ring 48 projects through the opening 50. The metal ring 48 is sized so that a padlock (not shown) or other similar locking device can be attached to the metal ring 48 to releasably secure the storage compartment door 42 to the storage compartment 14. Alternatively, the metal ring 48 and opening 50 can be replaced by a key operated lock defining the locking mechanism 44, which is well known in the art.

Referring now to FIGS. 4 and 5, the platform 12 includes a first or exterior facing side 52 and a second or interior facing side 54. In the first or raised position of the platform 12, as shown in FIG. 4, the first side 52 of the platform 12 lies substantially in a plane P defined by the externally facing surface 26 of the trailer body 18 and closes the doorway opening 22. In the second position of the platform 12, as shown in FIG. 5, the platform 12 is positioned substantially transverse to the plane P and defines a step for accessing the trailer body 18. The first side 52 of the platform 12 preferably is finished to conform to the externally facing surface 26 of the trailer body 18. The second side 54 of the platform 18 preferably includes a non-slip surface. The second side 54 can also be finished to conform to the internally facing surface 28 of the trailer body 18. As shown in FIG. 5, with the platform 12 in the second or lowered position, the storage compartment 14 is positioned substantially below the floor 24 of the trailer body 18, with the storage compartment door 42 generally facing the ground making the storage compartment 14 substantially inaccessible to users of the folding trailer 10.

FIG. 5 further shows a pair of pivot arms 60 pivotally connecting the platform 12 to the trailer body 18 so that the platform 12 is rotatably secured in the doorway opening 22. The pivot arms 60 each include a first member 62 formed with a pin 64. The first member 62 is pivotally connected to the trailer body 18 in the doorway opening 22. The pivot arms 60 each further include a second member 66 defining a slot 68 receiving the pin 64 of the first member 62. The second member 66 is pivotally connected to the platform 12. With the pin 64 of the first member 62 received in the slot 68 of the second member 66, the second member 66 is configured to rotate about the pin 64 when the platform 12 is rotated between the raised and lowered positions. The pins 64 are received in the respective slots 68 so that the first members 62 freely rotate about the pins 64, allowing the platform 12 to freely rotate between the raised position and the lowered position shown in FIGS. 4 and 5, respectively. Alternatively, the pivot arms 60 may be adapted to maintain the platform 12 in the raised and lowered positions shown in FIGS. 4 and 5, respectively.

With reference now to FIGS. 4 and 5, the platform 12 may further include a locking mechanism 70 which is preferably a key operated lock which is well known in the art. The locking mechanism 70 includes latches 72 adapted to cooperate with recesses 74 defined in the side wall 20 of the trailer body 18. The latches 72 are operated by the locking mechanism 70 and project into the recesses 74 when the locking mechanism 70 is placed in a locked configuration. The locking mechanism 70 releasably secures the platform 12 in the first or raised position in the doorway opening 22.

Figure 6:
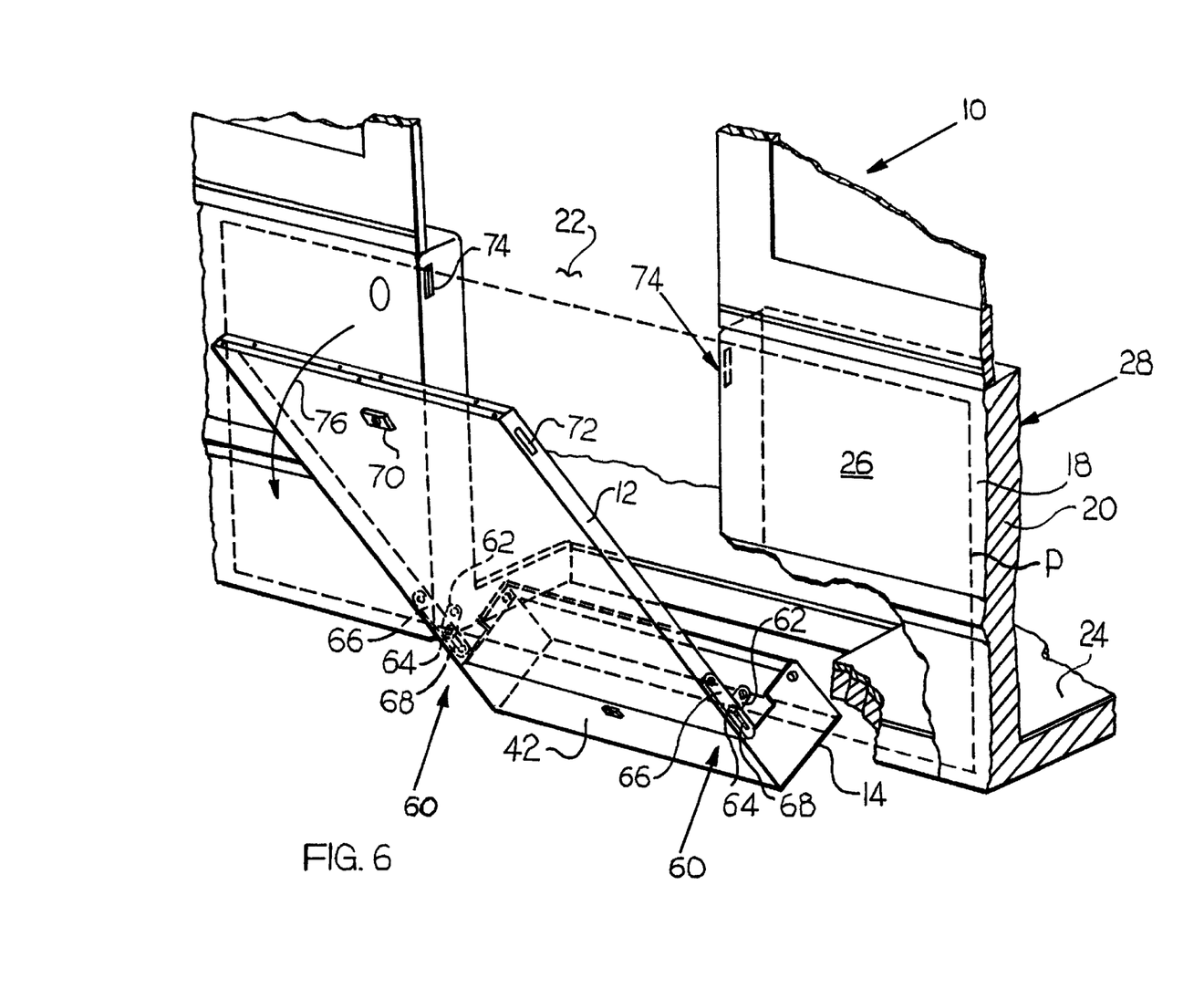
FIG. 6 is a perspective view of the folding trailer shown in FIG. 3 with the folding trailer body and floor partially cut away and showing the platform in a first intermediate position.
Figure 7:
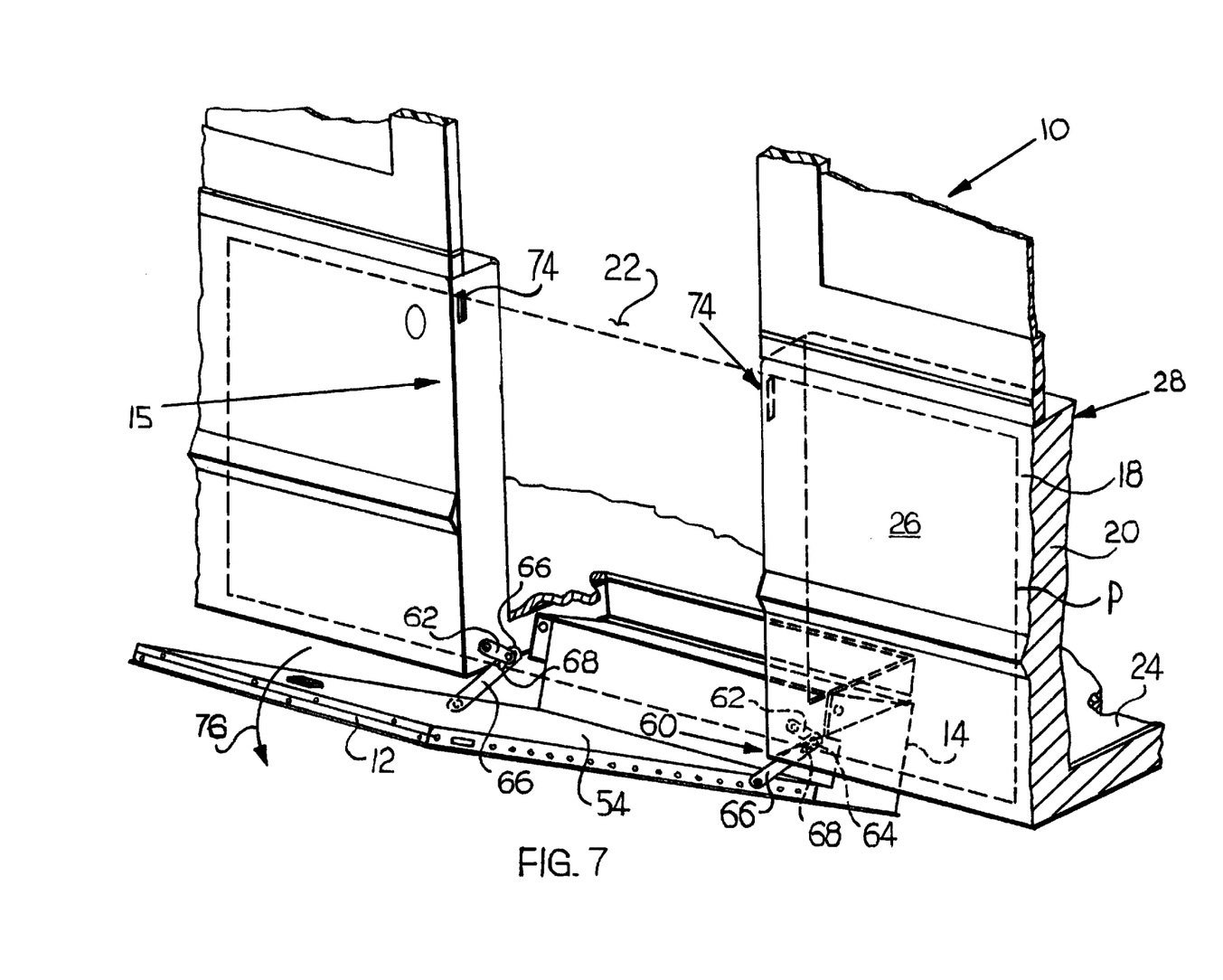
FIG. 7 is a perspective view of the folding trailer shown in FIG. 3 with the folding trailer floor partially cut away and showing the platform in a second intermediate position.

FIGS. 6 and 7 show the platform 12 in a first intermediate position and a second intermediate position, respectively, between the raised position shown in FIG. 4 and the lowered position shown in FIG. 5. When a moment designated by an arrow 76 is applied to the platform 12, the platform 12 is rotated, for example, from the raised position, shown in FIG. 4, to the intermediate positions shown in FIGS. 6 and 7. The pivot arms 60 simultaneously begin to rotate and extend, with the respective pins 64 freely rotating and sliding within the slots 68. The second members 66, as stated previously, freely rotate about the respective pins 64. Alternatively, the pivot arms 60 may be adapted to maintain the platform 12 in the intermediate positions shown in FIGS. 6 and 7 through frictional interaction between the first member 62 and the second member 66. In particular, the pivot arms 60 could maintain the platform 12 in the intermediate positions shown through frictional engagement between the respective pins 64 and a wall of the slots 68 defined by each of the second members 66. However, in the preferred embodiment discussed previously, the platform 12 freely moves from the raised position to the lowered position, with the pivot arms 60 providing the means for rotation of the platform 12 between these positions.

Figure 8:
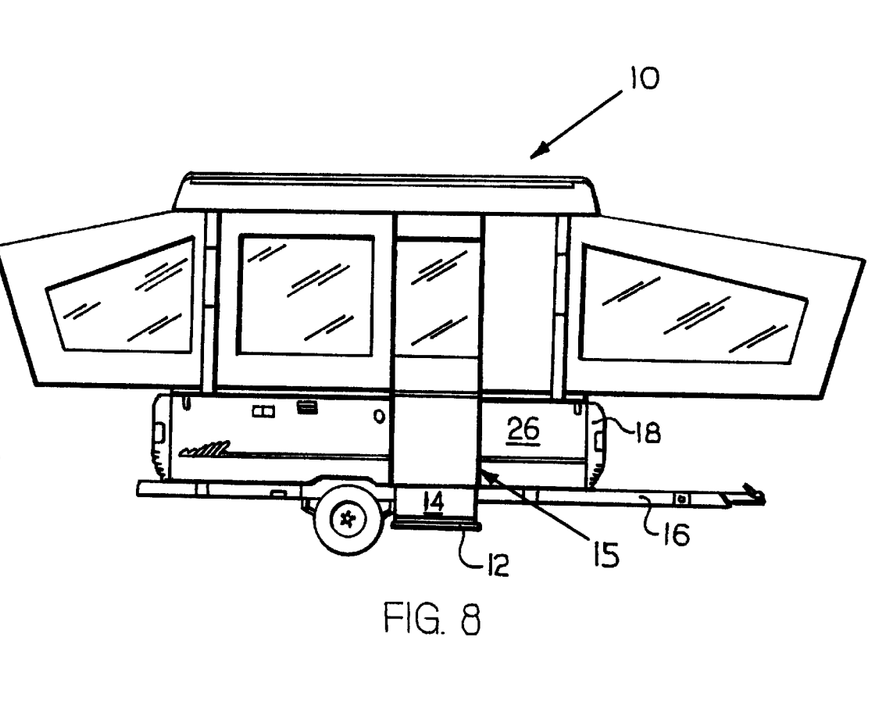
FIG. 8 is a side elevational view of the folding trailer shown in FIG. 1 with the platform in the second position.
Figure 9:
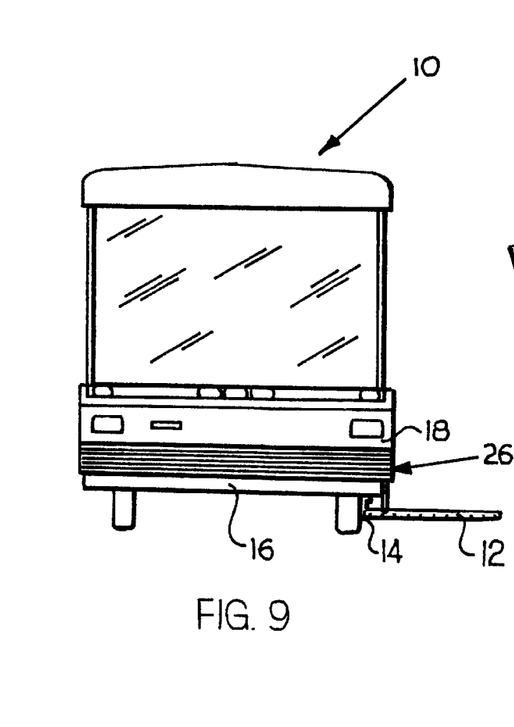
FIG. 9 is a rear elevational view of the folding trailer shown in FIG. 8.

FIGS. 8 and 9 show the folding trailer 10 with the platform 12 in the lowered position. The platform 12 in the lowered position, and in particular the second side 54 of the platform 12, defines a step that is positioned substantially perpendicular to the externally facing surface 26 of the trailer body 18 and horizontal to the ground. The storage compartment 14, when the platform 12 is in the lowered position, is positioned substantially below the floor 24 of the trailer body 18 and is not readily accessible as discussed previously.

With reference to FIGS. 1–9, operation of the platform 12 and the storage compartment 14 will now be discussed in greater detail. As shown in FIGS. 1–4, in the first or raised position of the platform 12, the platform 12 closes the doorway opening 22 of the trailer body 18 and the storage compartment 14 is exposed and accessible to users of the folding trailer 10. The storage compartment door 42 is exposed and can be placed in the opened or closed positions shown, respectively, in FIGS. 3 and 4. The locking mechanism 70 of the platform 12 can be engaged so that the latches 72 project into the recesses 74 to releasably secure the platform 12 in the raised position.

Referring now to FIG. 5, to position the platform 12 in the second or lowered position, the locking mechanism 70 of the platform 12 is disengaged and the locking mechanism 44 of the storage compartment door 42 is engaged. The locking mechanism 44 is engaged by closing the storage compartment door 42 so that the metal ring 48 projects through the opening 50 and placing a padlock or the like (not shown) through the metal ring 48. The storage compartment door 42 is thereby releasably secured to the storage compartment 14.

Referring to FIGS. 6 and 7, when a moment is applied to the platform 12 in the direction designated by the arrow 76, the platform 12 begins to rotate downward. The pivot arms 60 begin to rotate and extend, and the respective pins 64 freely rotate and slide within the slots 68. The storage compartment 14 rotates about the pivot pins 30. The platform 12 is freely rotatable about the pivot arms 60 from the raised position toward the lowered position.

Alternatively, frictional interaction between the first member 62 and the second member 66 of each of the pivot arms 60 can maintain the platform 12 in the intermediate positions shown in FIGS. 6 and 7. In this particular embodiment, the pivot arms 60 preferably maintain the platform 12 in the intermediate positions shown through frictional engagement between the respective pins 64 and a wall of the slots 68 defined by each of the second members 66.

As the platform 12 is rotated fully to the second or lowered position, the storage compartment 14 rotates about the pivot pins 30 and is positioned fully underneath the floor 24 of the trailer body 18. The end wall 40 of the storage compartment 14 abuts against an underside (not shown) of the floor 24. The storage compartment door 42 is now in a position fully below the trailer body 18 facing the ground and is thus substantially inaccessible by the users of the folding trailer 10. The now fully extended pivot arms 60 and the abutment of the end wall 40 against the underside of the floor 24 provide the support for the platform 12 in the lowered position, where it functions as a step. The platform 12 in the lowered position is positioned substantially transverse to the plane P, as shown in FIG. 5, and adjacent to the trailer body 18.

The folding trailer 10 made in accordance with the present invention provides an integrated storage space that is conveniently located for users of the folding trailer 10 and for storing cargo items. In addition, the folding trailer 10 made in accordance with the present invention provides an integrated storage space that is easily accessible by users of the folding trailer 10.

The invention has been described with reference to the folding trailer 10, but can be utilized with any type of recreational vehicle. The preferred embodiments described hereinabove are merely illustrative of the present invention and not restrictive thereof. Obvious modifications and alterations of the invention may be made without departing from the spirit and scope of the invention. The scope of the present invention is defined by the appended claims and equivalents thereto.

I claim:

1. A folding camping trailer, comprising:
    a trailer body defining a doorway opening;
    a platform having a first side and a second side; and
    a storage compartment connected to the platform,
    wherein at least one of the platform and the storage compartment is pivotally secured to the trailer body such that when the platform is in a first position the platform is received in the doorway opening and when the platform is rotated to a second position the second side of the platform defines a step positioned adjacent the trailer body.

2. The folding camping trailer of claim 1, wherein in the first position of the platform the first side of the platform lies substantially in a plane defined by an external surface of the trailer body, and wherein the first side of the platform conforms to the external surface of the trailer body.

3. The folding camping trailer of claim 1, further including a storage compartment door pivotally secured to the storage compartment.

4. The folding camping trailer of claim 3, wherein the storage compartment door further includes a locking mechanism adapted to releasably secure the storage compartment door to the storage compartment.

5. The folding camping trailer of claim 4, wherein the storage compartment further includes an internally positioned lip member providing a stop for the storage compartment door.

6. The folding camping trailer of claim 1 wherein the platform further includes:
   a pair of pivot arms pivotally connecting the platform to the trailer body; and
   a pair of pivot pins pivotally connecting the storage compartment to the trailer body,
   wherein the pivot arms are adapted to maintain the platform in the first and second positions and in intermediate positions between the first and second positions.

7. The folding camping trailer of claim 6, wherein the pivot arms each further include:
   a first member formed with a pin and pivotally connected to the trailer body in the doorway opening; and
   a second member defining a slot receiving the pin, with the second member pivotally connected to the platform,
   wherein the second member rotates about the pin when the platform is rotated between the first and second positions, and wherein the pin is received in the slot such that friction between the pin and a wall of the slot maintains the platform in the first and second positions and in the intermediate positions therebetween.

8. The folding camping trailer of claim 1, wherein the platform further includes a locking mechanism for securing the platform in the first position in the doorway opening.

9. The folding camping trailer of claim 1, wherein in the first position of the platform the storage compartment is accessible, and wherein in the second position of the platform the storage compartment is substantially inaccessible.

10. A folding camping trailer, comprising:
    a trailer body defining a doorway opening and having an external surface;
    a platform having a first side and a second side, with the first side conforming to the external surface of the trailer body; and
    a storage compartment integrally formed with the platform,
    wherein the platform and the storage compartment are each pivotally secured to the trailer body such that when the platform is in a first position the platform is received in the doorway opening and when the platform is rotated to a second position the second side of the platform defines a step positioned adjacent the trailer body, and
    wherein in the first position of the platform the first side of the platform lies substantially in a plane defined by the external surface of the trailer body and the storage compartment is accessible, and wherein in the second position of the platform the storage compartment is substantially inaccessible.

11. The folding camping trailer of claim 10, further including a storage compartment door pivotally secured to the storage compartment.

12. The folding camping trailer of claim 11, wherein the storage compartment door further includes a locking mechanism adapted to releasably secure the storage compartment door to the storage compartment.

13. The folding camping trailer of claim 12, wherein the storage compartment further includes internally positioned lip member providing a stop for the storage compartment door.

14. The folding camping trailer of claim 10, wherein the platform further includes:
    a pair of pivot arms pivotally connecting the platform to the trailer body; and
    a pair of pivot pins pivotally connecting the storage compartment to the trailer body,
    wherein the pivot arms are adapted to maintain the platform in the first and second positions and in intermediate positions between the first and second positions.

15. The folding camping trailer of claim 14, wherein the pivot arms each further include:
    a first member formed with a pin and pivotally connected to the trailer body in the doorway opening; and
    a second member defining a slot receiving the pin, with the second member pivotally connected to the platform,
    wherein the second member rotates about the pin when the platform is rotated between the first and second positions, and wherein the pin is received in the slot such that friction between the pin and a wall of the slot maintains the platform in the first and second positions and in the intermediate positions therebetween.

16. The folding camping trailer of claim 10, wherein the platform further includes a locking mechanism for securing the platform in the first position in the doorway opening.

17. A folding camping trailer, comprising:
    a trailer body defining a doorway opening and having an external surface;
    a platform having a first side and a second side, with the first side conforming to the external surface of the trailer body; and
    a storage compartment integrally formed with the platform, the storage compartment having a storage compartment door pivotally secured thereto,
    wherein the platform and the storage compartment are each pivotally secured to the trailer body such that when the platform is in a first position the platform is received in the doorway opening and when the platform is rotated to a second position the second side of the platform defines a step positioned adjacent the trailer body,
    wherein in the first position of the platform the first side of the platform lies substantially in a plane defined by the external surface of the trailer body and the storage compartment is accessible, and wherein in the second position of the platform the storage compartment is substantially inaccessible, and
    wherein the platform further includes:
      a pair of pivot arms pivotally connecting the platform to the trailer body; and
      a pair of pivot pins pivotally connecting the storage compartment to the trailer body,
      wherein the pivot arms are adapted to maintain the platform in the first and second positions and in intermediate positions between the first and second positions.

18. The folding camping trailer of claim 17, wherein the pivot arms each further include:
    a first member formed with a pin and pivotally connected to the trailer body in the doorway opening; and
    a second member defining a slot receiving the pin, with the second member pivotally connected to the platform, wherein the second member rotates about the pin when the platform is rotated between the first and second positions, and wherein the pin is received in the slot such that friction between the pin and a wall of the slot maintains the platform in the first and second positions and in the intermediate positions therebetween.

19. The folding camping trailer of claim 17, wherein the storage compartment door further includes a locking mechanism adapted to releasably secure the storage compartment door to the storage compartment.

20. The folding camping trailer of claim 19, wherein the platform further includes a locking mechanism for securing the platform in the first position in the doorway opening.

* * * * *

UNITED STATES PATENT AND TRADEMARK OFFICE
CERTIFICATE OF CORRECTION

PATENT NO.   : 6,135,526
DATED        : October 24, 2000
INVENTOR(S)  : Charles R. Reckner, Jr.

It is certified that error appears in the above-identified patent and that said Letters Patent is hereby corrected as shown below:

Claim 6, Column 7 Line 9, after "claim 1" insert --,-- (comma).

Claim 13, Column 8 Line 2, after "includes" insert --an--.

Signed and Sealed this

Eighth Day of May, 2001

Attest:

NICHOLAS P. GODICI

*Attesting Officer*   Acting Director of the United States Patent and Trademark Office